J. I. BEERS.
ALMOND HULLER.
APPLICATION FILED JUNE 22, 1915.

1,201,922.

Patented Oct. 17, 1916.
2 SHEETS—SHEET 1.

Witnesses
Fenton S Belt
J. W. Sherwood

Inventor
John I. Beers
By Franklin N. Hoyt
Attorney

UNITED STATES PATENT OFFICE.

JOHN ISAAC BEERS, OF CHICO, CALIFORNIA, ASSIGNOR OF ONE-HALF TO MRS. SADIE RANDLE AND A. J. LANDIS.

ALMOND-HULLER.

1,201,922.　　　　Specification of Letters Patent.　　Patented Oct. 17, 1916.

Application filed June 22, 1915.　Serial No. 35,664.

*To all whom it may concern:*

Be it known that I, JOHN I. BEERS, a citizen of the United States, residing at Chico, in the county of Bergen and State of California, have invented certain new and useful Improvements in Almond-Hullers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for hulling almonds.

In the growing of almonds, it sometimes happens that the cultivation of the ground will not be sufficient to retain moisture and which will result in the production of "stick tights", making the almond difficult to hull without soaking in water but, by the provision of my invention, a simple and efficient means is afforded for utilizing the apparatus as an almond huller.

Figure 3:
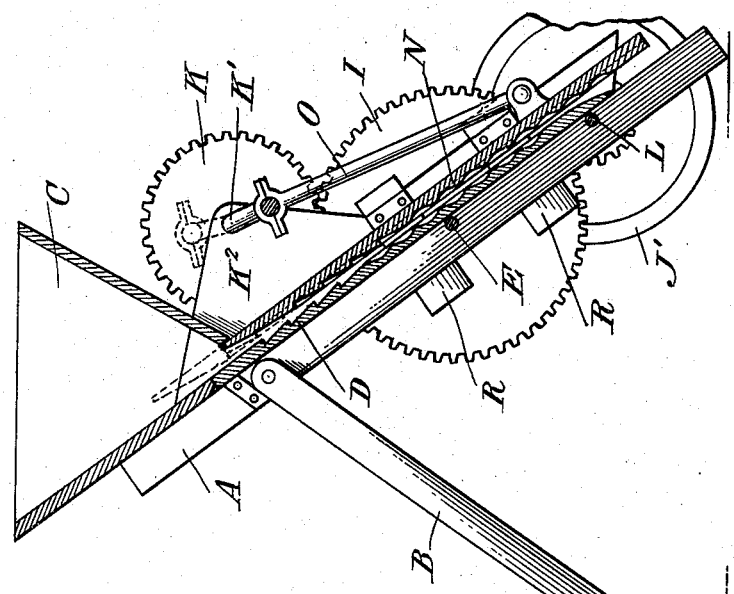
Figure 1:
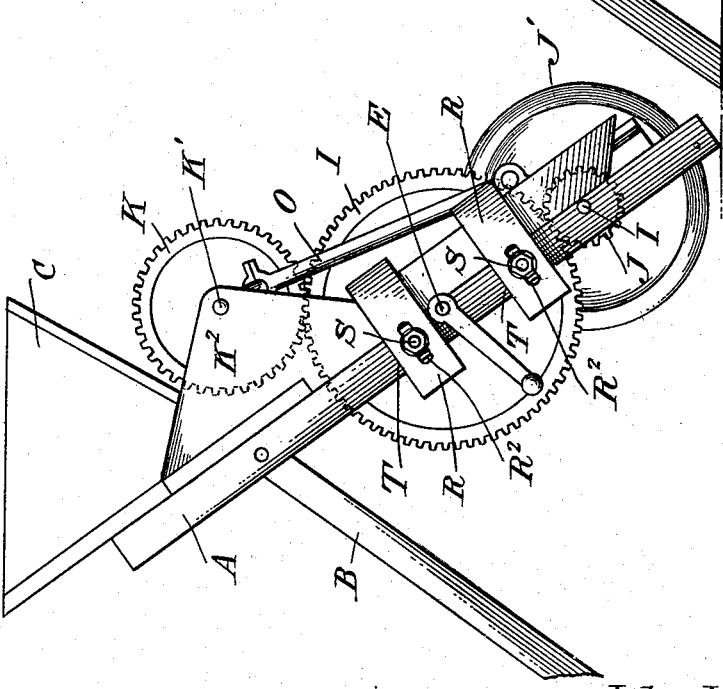
Figure 2:
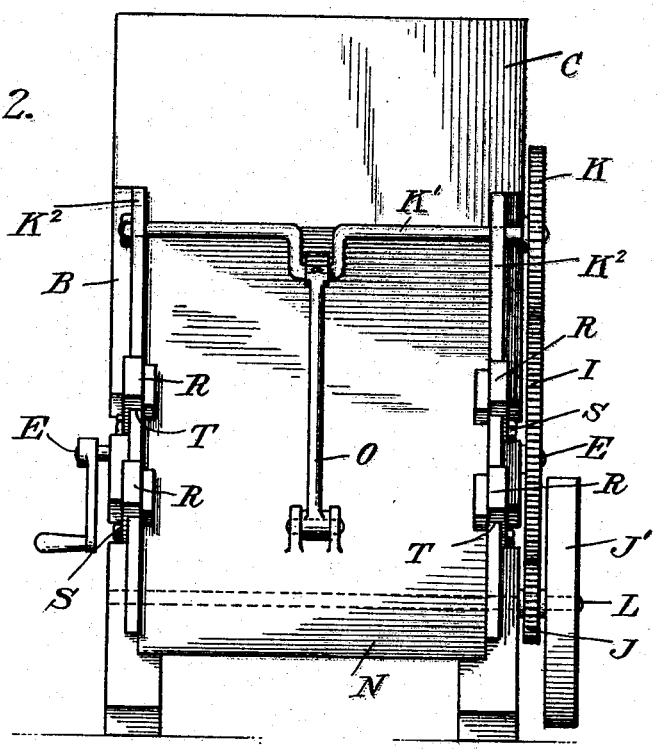

I illustrate my invention in the accompanying drawings, in which: Figure 1 is a side elevation of the apparatus. Fig. 2 is a top plan view. Fig. 3 is a longitudinal sectional view, and Fig. 4 is a cross sectional view.

Reference now being had to the details of the drawings by letter, A designates the frame of the apparatus, and B the hinged brace holding the apparatus at an inclination when in use. The frame is provided with a hopper C and the inclined surface D of the huller is corrugated as shown. An operating shaft E is journaled in suitable bearings in the frame and has a crank handle at one end and its other end has a gear wheel I fixed thereto which is in mesh with a gear J fastened to the shaft L journaled in the frame and upon which a flywheel J' is mounted. A gear wheel K is fixed to a crank shaft K', journaled in the sides $K^2$ of the frame, and is in mesh with the gear wheel I.

A reciprocating plate N, corrugated upon its under surface, is pivotally connected through the medium of the rod O with the crank of the shaft K', forming means for reciprocating said plate as the crank shaft K is rotated.

Figure 4:
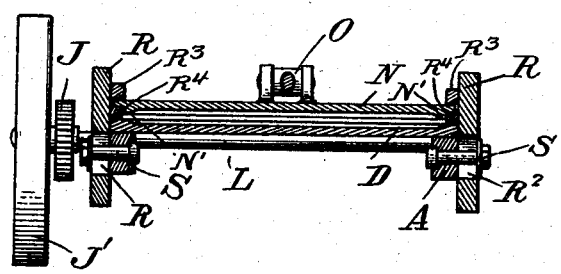

Adjustable bars R having slots $R^2$ are held in different adjusted positions upon the frame by means of the bolts S and nuts thereon, said bolts being mounted in apertures upon the frame A, and each bar has cleats $R^3$ and $R^4$ projecting from the inner faces thereof and spaced apart and between which the plate N is adapted to have a reciprocating movement, said plate N having shoulders N' at its opposite edges adapted to engage the cleats $R^4$, as shown clearly in Fig. 4 of the drawings. Said bars are movable in recesses T formed in the frame.

In operation, the nuts are placed in the hopper and the plate N held in proper adjustment according to the size of the nuts to be hulled. By turning the crank, the plate N is reciprocated, causing the nuts to contact with the corrugations upon the frame and plate, thus removing the hulls. By the longitudinal adjustment of the bars R, it will be noted that the plate N may be held nearer to or farther from the corrugated surface of the frame, adapting the machine for operation on different sizes of almonds.

By the provision of an apparatus embodying the features of my invention, I have found that, by proper adjustment of the plates, nuts of various sizes may be hulled without breaking the meats.

Upon reference to Fig. 3, it will be noted that the inclined surface D and the adjacent wall of the hopper C are arranged in the same plane. It will also be noticed that the bars R, which are disposed at right angles to the frame A, extend over and constitute a track or guideway for the movable plate N, which latter is thus guided parallel with the inclined surface D.

What I claim to be new is:—

An apparatus for hulling almonds, consisting of a frame, means for supporting the same in an inclined position, an inclined corrugated surface fixedly supported on the upper face of said frame, a hopper secured to the upper end of said frame and having a wall forming a continuation of said inclined surface, a plate having corrugations upon its face adjacent said inclined surface, means for reciprocating said plate over said inclined surface, and bars disposed at right angles to said plate and adjustably mounted upon said frame to and from the corrugated surface, forming a guide for said plate in its reciprocations.

In testimony whereof I hereunto affix my signature in presence of two witnesses.

JOHN ISAAC BEERS.

Witnesses:
LILLIE BELL BEERS,
AMOS J. LANDIS.

Copies of this patent may be obtained for five cents each, by addressing the "Commissioner of Patents, Washington, D. C."